ial No. 240,267

United States Patent Office
2,775,559
Patented Dec. 25, 1956

2,775,559
IMPROVED LUBRICANTS

Chester M. Himel and Lee O. Edmonds, Bartlesville, Okla., assignors to Phillips Petroleum Company, a corporation of Delaware No Drawing. Original application December 28, 1948, Serial No. 67,768, now Patent No. 2,671,804, dated March 9, 1954. Divided and this application August 1, 1951, Serial No. 240,267

7 Claims. (Cl. 252—47)

This invention relates to the preparation of organic sulfur polyamides and to their uses. In a more particular aspect, this invention relates to the preparation of sulfenamides and thiosulfenamides of alkylene polyamines and to lubricating oil additives which are particularly valuable both in increasing the stability of said oils against oxidative deterioration and in improving the corrosion inhibiting properties of the lubricant. In one of its specific aspects the invention relates to the preparation of alkylene polyamine sulfenamides and thiosulfenamides of different degrees of substitution and to the use of these partially substituted polyamines as lubricating oil antioxidants and corrosion inhibitors.

This application is a division of our copending application Serial No. 67,768, filed December 28, 1948, now U. S. Patent 2,671,804, issued March 9, 1954.

Many uses have been discovered and developed for chemical compounds containing both sulfur and nitrogen as constituents of the compound. Especially useful are the compounds which may be classified as organic sulfur amides or more particularly, as sulfenamides and thiosulfenamides. Among the numerous uses to which they are applied, these compounds are employed as antioxidants for lubricating oil, as corrosion inhibitors for general use, and as intermediates in the production of other useful compounds. Sulfenamides and thiosulfenamides from monoamines have been prepared by various methods, such as the interaction between a mercaptan and a primary or secondary monoamine and the interaction between an organic sulfur halide and a monoamine. These interactions in the preparation of sulfenamides from monoamines have been accelerated by the presence of oxidizing agents, such as the halogens, alkali hypohalites, hydrogen peroxide and the like, and in some instances, in the presence of rather weak alkaline solutions. In a copending application by one of us, Serial No. 617,871, filed September 21, 1945, now abandoned, the preparation of sulfenamides from a sulfenyl halide and a monoamine under anhydrous conditions is described and in another copending application by us, Serial No. 783,854, filed November 3, 1947, now U. S. Patent 2,520,400, the preparation of sulfenamides from a sulfenyl halide and a monoamine in the presence of a dilute aqueous alkaline solution is described. These compounds are especially useful as lubricating oil additives as disclosed in Himel et al., U. S. 2,439,734, issued April 13, 1948.

We have now discovered that alkylene polyamines react with sulfenyl halides and thiosulfenyl halides in a manner similar to the interaction of the latter compounds with monoamines and by such interaction, sulfenamides and thiosulfenamides, respectively, may be prepared from polyamines. Furthermore and foremost, we have discovered that the average degree and extent of substitution of the amino groups in the polyamines may be controlled by suitable adjustment and control of reaction conditions. These compounds are found to be highly desirable as additives for oils to prevent corrosion and to retard oxidation of the oils. For particular purposes, it is found that the sulfur- and nitrogen-containing derivatives of the polyamine compounds in which only a portion of the amino groups are substituted with sulfenyl groups are especially desirable. Such compounds have the additional properties peculiar to sulfenamides while retaining, as a result of unsubstituted amino groups, certain chemical characteristics, such as water solubility, which are a feature of the amines. When attempts were made to substitute only partially in the amino groups by methods employed with monoamines, we have found that only relatively minor amounts of such partially substituted sulfenamides are formed. When operating in the manner usually employed with monoamines, substitution appears to proceed practically to completion so that substantially all of the possible repleaceable hydrogens of the amino groups are substituted. However, by an adjustment of the concentration of the alkaline solution and by other critical factors herein disclosed, it is possible to control effectively the predominant product of reaction.

According to the process of our invention wherein the degree of substitution of the amino groups is controlled, the alkylene polyamine is commingled with a concentrated aqueous alkaline solution and then admixed with an organic sulfur halide, such as a sulfenyl or thiosulfenyl halide, which is preferably dissolved in a low-boiling hydrocarbon solvent. The sulfenamide or thiosulfenamide product of reaction is concentrated in the hydrocarbon solvent phase and may be recovered by evaporation of the solvent, preferably under vacuum distillation. The product of the lighter alkyl sulfur halides and lower amines is usually a thick viscous liquid. It is particularly favorable to the reaction that there also be present an organic solubilizing agent, such as chloroform, which is miscible with the hydrocarbon and which will increase the solvent power of hydrocarbon phase for the polyamine, the solvent power of the aqueous phase for the polyamine being greatly diminished as the concentration of the alkaline material is increased.

The exact relative functions of the various components of the reactant mixture in the preparation of the polyamine sulfenamides and thiosulfenamides are not fully understood but a possible explanation is that the alkylene polyamine is transferred from the aqueous alkaline phase to the hydrocarbon phase at such a rate that the substitution of sulfenyl and thiosulfenyl groups on the polyamine molecules takes place according to the normal probability curve; that is, the average degree of substitution will be determined by the ratio of the molecular amounts of sulfenyl or thiosulfenyl halide to the amine aquivalents of polyamine employed and thereby to the number of repleaceable hydrogens associated with the amino groups. The degree of substitution can be varied at will by increasing or diminishing this ratio. The ratio of sulfenyl or thiosulfenyl halide to the polyamine can be varied in accordance with the degree of substitution desired and with the particular polyamine employed. For example, when using two mols of sulfenyl or thiosulfenyl halide to one mol of an alkylene diamine, the resulting product should be predominantly 50 percent substituted, while with the same ratio of sulfenyl or thiosulfenyl halide to trialkylene tetramine, the product should be predominantly 33 percent substituted; in other words, the predominant product will be a sulfenamide or thiosulfenamide in which the substitution is present in a proportion which may be determined from the ratio of mols of reactant sulfenyl or thiosulfenyl halide, respectively, to replaceable hydrogens in the amino groups. In the absence of concentrated alkali and an organic solubilizing agent for the polyamine, substitution proceeds substantially to complete replacement in the molecules which undergo reaction. On the other hand, with concentrated alkaline solutions and a solubilizing agent the control described can be effected.

Alkylene polyamines adaptable to our process comprise compounds of the general formula $$H_2N[(CH_2)_xNH]_yH$$

in which $x$ represents a whole number greater than one, preferably a whole number from 2 to 6 inclusive, and in which $y$ is a whole number, preferably from 1 to 10. Although $x$ will probably not be much greater than 6, the value for $y$ may vary over a much wider range, up to 100 or higher. From an examination of the general formula, it is readily observed that the possible number of replaceable hydrogens in the amino groups of the polyamine may be determined by the expression $y+3$ or in other words, is two more than the number of amino groups in the amine molecule. Typical compounds of this formula are ethylene diamine and its homologues, diethylene triamine, triethylene tetramine, tetraethylene pentamine, dipropylene triamine, butylene diamine, and the like. The organic sulfur halides employed in this process may be represented by the formula R—$S_m$—X, in which R represents alkyl, aryl or aralkyl radicals and corresponding substituted radicals; X represents a halogen, preferably chlorine, although iodine and bromine are likewise applicable; and $m$ is an integer 1 or 2. Thus the sulfur halides include the compounds particularly denominated sulfenyl halides and thiosulfenyl hlaides. These reactant halides can be obtained from any convenient source or can be prepared as used, if desired. For example, they can be prepared by the interaction of a corresponding mercaptan or disulfide with elemental halogen and preferably in the presence of an organic solvent. It is particularly advantageous to employ as a solvent in the preparation of the sulfenyl halide or thiosulfenyl halide reactant, a hydrocarbon which may also be used as the solvent in the reaction forming the corresponding sulfenamide or thiosulfenamide. In such a case the reactant halide as formed in the hydrocarbon may be used directly in the preparation of sulfenamides or thiosulfenamides without separation from its solvent. This is a particularly desirable manner of operation in the case of those organic sulfur halides which are unstable and tend to decompose during separation from the solvent in which they are prepared.

The alkaline material employed in the practice of the present invention is preferably sodium hydroxide which is preferred because of its cheapness and ready availability. However, the process of the present invention can be practiced with the hydroxides and carbonates of alkali metals, such as sodium, potassium or lithium and with the oxides, hydroxides and carbonates of other metals, such as calcium and other alkaline earth metals, which furnish an aqueous alkaline solution of the desired concentration. For control of the degree of substitution of the amino groups of the polyamine, the concentration of the alkaline aqueous solution can be varied within the range between 35 percent by weight and 70 percent by weight, depending upon the relative concentrations of the reactants and upon the degree of substitution desired. When substituting the polyamine molecules only partially, relatively large amounts of highly concentrated alkaline solution is used and the amount of alkaline material to be used may be related to the sulfenyl or thiosulfenyl halide employed. For example, when employing the preferred sodium hydroxide, the molar ratio of caustic to sulfenyl or thiosulfenyl halide may be in the range of 1.0 to 5.0, preferably within a range of 1.2 to 2.0.

The solubilizing agents employed in the present process comprise organic materials which are miscible with the hydrocarbon solvent in which the sulfenyl halide is dissolved and which possess a high solvent power for the alkylene polyamine employed. It is necessary that the solubilizing agents be inert with respect to the reactants, as well as to the alkaline material and the solvent employed in the respective phases. Suitable solubilizing agents include chloroform, carbon tetrachloride, dioxane, and ethers, such as diethyl and dipropyl ethers and their halogenated derivatives. It has been found that chloroform is especially adaptable and available as a preferred solubilizing agent.

The solvent employed for the sulfenyl halide or thiosulfenyl halide will preferably be a paraffin hydrocarbon, such as pentane or hexane, or a mixture of such hydrocarbons. It is particularly efficacious to employ a mixture which boils at the desired reaction temperature so that the reaction may be carried out in the presence of refluxing solvent. By operating in the presence of such a refluxing solvent, reaction temperatures can be easily maintained at the desired level and a certain degree of agitation is automatically provided. It is essential that the solvents selected be free from appreciable amounts of sulfur, sulfur compounds, oxygenated compounds, nitrogen compounds, unsaturated hydrocarbons or other impurities which would interfere with the reaction or contaminate the product. The concentration of sulfenyl or thiosulfenyl halide in the solvent does not appear to be critical, but it is satisfactory to operate in the concentration range where one gram mol of the organic sulfur halide reactant is dissolved in 800–1600 cc. of solvent.

The reaction proceeds smoothly at atmospheric pressure and room temperature. However, where desirable, pressures either above or below atmospheric may be employed. Likewise, a temperature within the range between 0° and 65° C., but preferably between 20° and 35° C., may be employed, although a temperature beyond these limits either way may also be used, depending upon the stability of the reactants and the products. Although it is possible to add all the reactants initially in conducting the process, control of the temperature and of the reaction is more difficult. Hence a preferred method is to dissolve the amine in the solubilizing agent—the chloroform for example, and then thoroughly admix the aqueous alkaline solution therewith. The organic sulfur halide reactant should be separately dissolved in a suitable hydrocarbon solvent and this solution added slowly with constant agitation to the alkaline solution of the polyamine; as suggested above, the sulfenyl or thiosulfenyl halide may conveniently be prepared in the presence of a hydrocarbon solvent which will be satisfactory for the present reaction and thereby the hydrocarbon solution of organic sulfur halide reactant will be ready for use as soon as prepared. Upon mixing the respective solutions of halide reactant and the alkylene polyamine, reaction proceeds smoothly with the formation of the desired sulfenamide or thiosulfenamide and by-product hydrogen halide; the sulfenamide or thiosulfenamide product is concentrated in a non-aqueous phase from which it is readily recovered.

We have found that the alkylene polyamine sulfenamides and thiosulfenamides prepared by the process described are useful as lubricating oil additives and are particularly effective as antioxidants. Particularly beneficial improvements have been found when small amounts of the sulfenamides are employed. These compounds, when added in relatively small quantities to lubricating oils, favorably inhibit the tendency of the oils to oxidize and, at the same time, do not produce deleterious effects on other properties. The amount of the N-sulfenyl polyamides employed will usually be less than 8 percent by weight based on the weight of the oil and generally it will range between 0.01 and 5 percent by weight. It is found that additions of these polyamides enhance the anti-corrosive properties of the oils in engine performance.

Upon heating in the presence of oxygen, most uninhibited oils show marked increases in the values for neutralization number and viscosity. These values may be considered as indications of the stability of a given oil toward oxidation and there is generally a direct correlation between antioxidant effect and these values. In most oils an increase in viscosity occurs on heating in air and an antioxidant prevents or reduces this increase. Oxidation stability of both the uninhibited and inhibited oils was determined by the aluminum block method as given in the official Government test which is designated as: Federal Specification VV-L-791b, Method 345.2—Stability of Lubricating Oils. This is a well-known and accepted method for determining lubricating oil stability in which tared samples of the oil are heated in contact with air at a constant temperature of 350° F. for twenty-four hours and the changes in physical characteristic resulting from the heating are determined.

The corrosion-inhibiting properties of a lubricating oil are determined from the weight loss of tared test connecting-rod bearings. In a standard test denominated by the Society of Automotive Engineers as the Lauson Engine Test Procedure RLT-1a, a determination is made of the bearing loss in milligrams of weight during operation of a Lauson engine at constant speed and load for a total of 60 hours for SAE 10 grade oil and 80 hours for heavier grade oils while maintaining the test oil in the engine at a given temperature.

The following examples illustrate the results and degrees of substitution which may be obtained by control of the ratio of reactants and the presence of concentrated alkaline solution in the preparation of various sulfenamides. Certain of the examples also show the value of the polyamides as lubricating oil additives in inhibiting oxidation and corrosion.

*Example 1*

Comparative experiments were conducted in the preparation of N-sulfenyl derivatives of tetraethylene pentamines.

In the first experiment (run A) one mol of tertiary-butyl sulfenyl chloride in 1600 cc. of isopentane was mixed with 0.5 mol of tetraethylene pentamine in 240 grams of 20 percent aqueous solution of sodium hydroxide. The mixture was stirred vigorously at the temperature of refluxing isopentane for one hour.

In a second experiment (run B) the same amounts of reaction materials were employed but the pentamine was dissolved in 400 grams of a 50 percent sodium hydroxide solution and solubilized in the non-aqueous phase with 400 cc. of chloroform as the solubilizing agent. The mixture was stirred vigorously while the tertiary-butyl sulfenyl chloride in isopentane was added; stirring of the mixture was continued for one hour in the refluxing isopentane.

In each case the product was isolated by separating the non-aqueous layer and removing the solvent therefrom by vacuum distillation. The resulting viscous liquid product was then washed with distilled water and dried. The percentage yield based on the sulfenyl chloride added and the percentage nitrogen in the amine product were determined. The average degree of substitution was computed on the basis of equivalents of hydrogen replaced by sulfenyl groups and the percentage of substitution was computed on the basis of the ratio of equivalent hydrogens replaced to the total replaceable hydrogens in the amino groups.

The results of the two experiments are recorded below.

| Run | Sulfenamide Yield (percent) | Nitrogen Content (percent) | Substitution | |
|---|---|---|---|---|
| | | | Average Degree | Average Percent |
| A | 78 | 9.64 | 6.1 | 87.3 |
| B | 88 | 15.11 | 3.2 | 45.8 |

*Example 2*

1.1 mols of tetraethylene pentamine were added to 5 liters of chloroform. To this mixture was added 400 grams of a 50 percent aqueous solution of sodium hydroxide (5 mols of sodium hydroxide). While the mixture was stirred vigorously, a solution of 5 mols of tertiary-butyl sulfenyl chloride in 8 liters of n-hexane was added gradually. The tertiary-butyl sulfenyl chloride was previously prepared in the hexane by passing chlorine into the hydrocarbon solution of tertiary-butyl disulfide at a temperature of 32° C. under an atmosphere of nitrogen.

The reaction mixture was stirred for approximately one hour following the addition of the sulfenyl chloride at a reaction temperature of 50° to 60° C. The non-aqueous layer was separated and the solvent removed by distillation. The resulting product was washed with water and dried. The average degree of substitution was 5 and the yield of substituted amine based on the sulfenyl chloride was 85 percent. The average percent of substitution was 71.

*Example 3*

2.0 mols of tetraethylene pentamine were dissolved in 5 liters of chloroform and admixed with 400 grams of a 50 percent aqueous solution (5 mols) of sodium hydroxide. To this mixture was slowly added 4 mols of tertiary-butyl sulfenyl halide in solution in 6 liters of pentane. The reaction mixture was stirred for approximately one hour at a reaction temperature of approximately 35° to 45° C. The product was isolated as above and had an average degree of substitution of 3.0. The yield based on the sulfenyl halide was 85 percent. The average percent of substitution was 43.

*Example 4*

2.0 mols of tetraethylene pentamine were dissolved in 5 liters of chloroform and admixed with 400 grams of a 50 percent aqueous solution of sodium hydroxide (5 mols of sodium hydroxide). To this mixture was slowly added 4 mols of tert-butyl thiosulfenyl chloride in solution in pentane. The reaction mixture was stirred for approximately one hour at a reaction temperature of approximately 35° to 45° C. The thiosulfenamide product was isolated as in Example 1 and had an average degree of substitution of 3.1 and the yield based on the thiosulfenyl halide was about 87 percent. The average percent of substitution was about 44.

*Example 5*

A portion of the tetraethylene pentamine penta-tertiary-butyl sulfenamide of Example 2 was added to a commercial SAE 30 lubricating oil in a concentration of 1.5 percent by weight. Lauson Engine corrosion tests were run on the oil with parallel tests being run on untreated oil as a control. Results of these tests show that when using the oil containing 1.5 percent of the tetraethylene pentamine penta-tertiary-butyl sulfenamide, bearing loss was 85 percent less than when using the untreated oil, specific values being a loss of 870 mg. with the untreated oil and 136 mg. with the oil containing the additive. These data were obtained in an 80-hour Lauson engine test at a crank case temperature of 285° F.

*Example 6*

The partially substituted sulfenamide, that is, tetraethylene pentamine tri-tertiary-butyl sulfenamide, prepared in Example 3, was tested as a bearing corrosion inhibitor in a commercial SAE 30 lubricating oil. The sulfenamide was added to the lubricating oil in a concentration of 2.5 percent. Results of this Lauson engine test show that bearing corrosion was reduced by 89 percent when using this sulfenamide additive. Specific values obtained are tabulated below.

| Additive (percent) | Bearing Loss (Mg.) |
|---|---|
| None | 870 |
| 2.5 | 98 |

Example 7

Samples of the tetraethylene pentamine penta-tertiary-butyl sulfenamide from Example 2 hereinafter referred to as additive A, and the tetraethylene pentamine tri-tertiary-butyl sulfenamide from Example 3 hereinafter referred to as additive B, were tested to determine their antioxidant properties. These additives were mixed with a neutral oil and the blends heated by the aluminum block method as specified in the test Federal Specification VV-L-791b, Method 345.2. Properties of the treated oils were studied and compared with the properties of a control test carried out on a sample of the oil in which no additive was used. Results of these tests are tabulated below:

| | Control | | Oil + 1.0 percent A | | Oil + 1.0 percent B | |
|---|---|---|---|---|---|---|
| | New Oil | Heated at 350° F. | New Oil | Heated at 350° F. | New Oil | Heated at 350° F. |
| Neutralization Number | 0.00 | 0.13 | 0.01 | 0.05 | 0.00 | 0.06 |
| Viscosity at 100° F. (SUS) | 476.4 | 499.6 | 477.8 | 493.6 | 477.3 | 494.1 |
| Viscosity at 100° F. (SUS) (corrected [1]) | 492.7 | | 493.6 | | 493.1 | |
| Viscosity Increase, percent | | 1.4 | | 0.0 | | 0.2 |

[1] Viscosity of unheated oil corrected for evaporation loss.

From the foregoing examples it can be seen that the N-substitution of the polyamines may be controlled to prepare sulfenyl derivatives of the desired degree of substitution, which are useful as lubricating oil anti-oxidants and corrosion inhibitors. The experiments of Example 1 clearly illustrate by comparative results the control of substitution to be effected by the concentration of the alkaline solution and use of solubilizing agents. It is shown that, under the same conditions except alkaline concentration and solubilizing agent, substitution proceeds substantially to completion when weaker alkaline solution is employed, while the degree of substitution is substantially equivalent to the molecular ratio of sulfenyl halide to polyamine when the alkaline solution is concentrated. A comparison of the results and of the product in each of Examples 1, 2 and 3 shows further that the degree of substitution is a function of the ratio of the reactants when reaction is effected in presence of concentrated alkaline solution. As the ratio of sulfenyl halide is increased with respect to the amine in the presence of the same concentrated alkaline solution and under the same conditions, the degree of substitution is also increased. Thus the degree of substitution may be altered by employing concentrated alkaline solution as solvent for the polyamine instead of weak alkaline solution and, when so employing the concentrated alkaline solution, varying degrees of partial substitution may be effected. In other words, sulfenyl polyamides may be prepared by reaction of sulfenyl halides with polyamines in the absence of or in the presence of aqueous alkaline solutions, but in the case of weak alkaline solutions, reaction may not be controlled and substitution will be substantially complete on the polyamine reacting; whereas, in the case of concentrated alkaline solutions, the degree of substitution may be controlled by varying the ratio of the sulfenyl halide to the amine for any particular polyamine. Examples 4, 5, and 6 amply show the benefits and improvements which are obtained by the use of small amounts of the present sulfenyl polyamides in lubricating oils.

Although the invention has been described by specific illustrations, it will be understood that various changes and modifications, as well as different reactants, are possible and will be apparent to one skilled in the art and that it is intended to cover all modifications inherent in the invention.

We claim:

1. An improved lubricant comprising a major proportion of a mineral lubricating oil containing an alkylene polyamine partially N-substituted with at least one of RS— and RSS— in which R is a radical selected from the group consisting of alkyl, substituted alkyl, aryl, substituted aryl, aralkyl and substituted aralkyl, in an amount sufficient to impart antioxidant and anticorrosive characteristics to said lubricant, but less than 8 weight percent of said oil.

2. A lubricant according to claim 1 wherein said partially N-substituted alkylene polyamine is present in an amount ranging from 0.01 to 5 percent by weight of said oil.

3. An improved lubricant comprising in major proportion a mineral lubricating oil containing a tetraethylene pentamine N-tert-butylsulfenamide containing at least one hydrogen atom attached to a nitrogen atom, in an amount sufficient to impart antioxidant and anticorrosion characteristics to said lubricant but less than 8 weight per cent of said oil.

4. A lubricant according to claim 2 wherein said partially N-substituted alkylene polyamine is present in an amount substantially equal to 1.5 percent by weight of said oil.

5. An improved lubricant comprising in major proportion a mineral lubricating oil containing from 0.01 to 5 weight percent of tetraethylene pentamine penta- tertiary-butyl sulfenamide.

6. An improved lubricant comprising in major proportion a mineral lubricating oil containing from 0.01 to 5 weight per cent of tetraethylene pentamine tri-tertiary-butyl sulfenamide.

7. An improved lubricant comprising in major proportion a mineral lubricating oil containing an alkylene polyamine partially N-substituted, with at least one of RS— and RSS— in which R is a radical selected from the group consisting of alkyl, substituted alkyl, aryl, substituted aryl, aralkyl and substituted aralkyl, in an amount sufficient to impart antioxidant and anticorrosive characteristics to said lubricant.

References Cited in the file of this patent

UNITED STATES PATENTS

| 2,439,734 | Himel et al. | Apr. 13, 1948 |
| 2,474,237 | Eby | June 28, 1949 |
| 2,554,097 | Edmonds | May 22, 1951 |